United States Patent
Dokyu et al.

(10) Patent No.: US 6,228,530 B1
(45) Date of Patent: May 8, 2001

(54) DRY CELL AND METHOD OF MANUFACTURING OUTER METAL JACKET THEREOF

(75) Inventors: Tensaburo Dokyu, Hirakata; Akio Sakamoto, Chigasaki; Keiji Ogino, Katano, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/269,956

(22) PCT Filed: Sep. 3, 1997

(86) PCT No.: PCT/JP97/03093

§ 371 Date: Apr. 8, 1999

§ 102(e) Date: Apr. 8, 1999

(87) PCT Pub. No.: WO99/12218

PCT Pub. Date: Mar. 11, 1999

(51) Int. Cl.[7] ............... H01M 2/02; H01M 2/08; H01M 6/00
(52) U.S. Cl. ............ 429/168; 429/171; 429/172; 29/623.1; 29/623.2
(58) Field of Search ............... 29/623.1, 623.2; 429/164, 166, 168, 171, 172, 94

(56) References Cited

U.S. PATENT DOCUMENTS

| 3,627,586 | * | 12/1971 | Jammet | 136/107 |
|---|---|---|---|---|
| 3,630,783 | * | 12/1971 | Przybyla | 136/107 |
| 3,660,168 | * | 5/1972 | Ralston et al. | 136/107 |
| 3,859,137 | * | 1/1975 | Jammet | 136/107 |
| 4,227,701 | * | 10/1980 | Tsuchida et al. | 227/12 |
| 4,722,874 | * | 2/1988 | Marchak | 429/56 |
| 4,965,149 | | 10/1990 | Ashihara et al. | |

FOREIGN PATENT DOCUMENTS

| 0333023A1 | * | 9/1989 | (EP) . |
|---|---|---|---|
| 48-14812 | | 5/1973 | (JP) . |
| 54-139845 | | 10/1979 | (JP) . |
| 63-14360 | | 1/1988 | (JP) . |
| 63-3056 | | 1/1988 | (JP) . |

\* cited by examiner

Primary Examiner—Clifford C. Shaw
Assistant Examiner—Colleen P. Cooke
(74) Attorney, Agent, or Firm—Jordan and Hamburg LLP

(57) ABSTRACT

Notches (21a, 21b) are formed at the corners of only one side edge (19a) of a metal jacket blank (19) of a rectangular metal strip. The blank (19) is rolled into a cylindrical shape so that its opposite sides (19a, 19b) are adjoined to each other forming an abutment joint (10) and a lower end (19c) of the blank (19) is inwardly curled and crimped to form a bottom, thus completing an outer metal jacket (18). After a cell member (26) is loaded into the metal jacket (18), the upper end (19d) of the blank (19) is inwardly curled and crimped to cause the notches (21a, 21b) to abut the other side edge (19b) of the blank (19), forming a curled abutment joint (20) along a direction (S) which is different from the radial direction (R) of the metal jacket (18). This arrangement prevents any dents caused by the buckling of the outer metal jacket (18) while being crimped, and allows dry cells to be more efficiently produced.

19 Claims, 4 Drawing Sheets

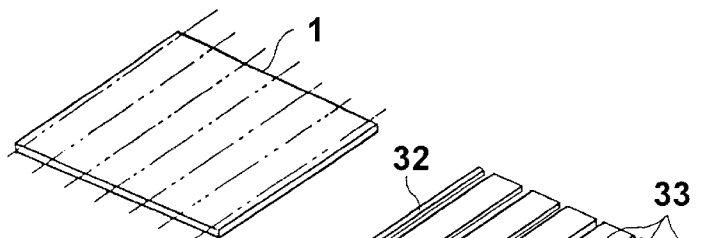
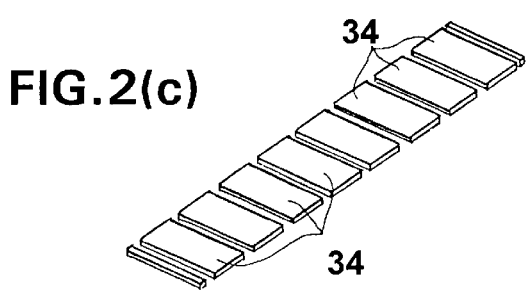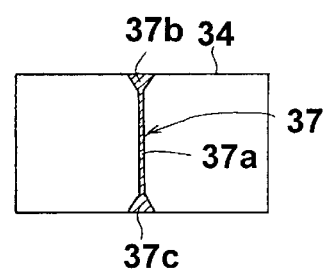
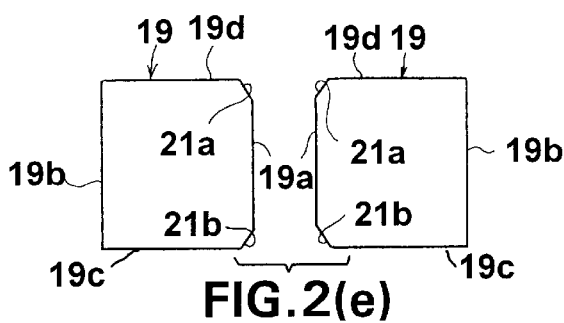
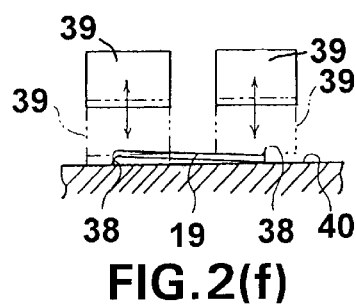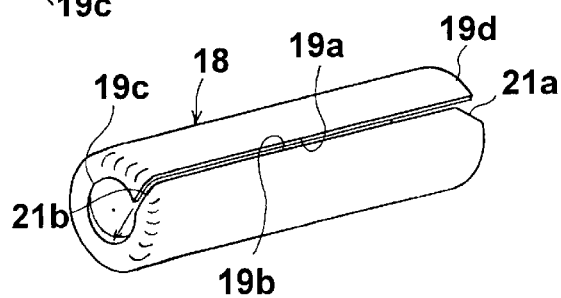

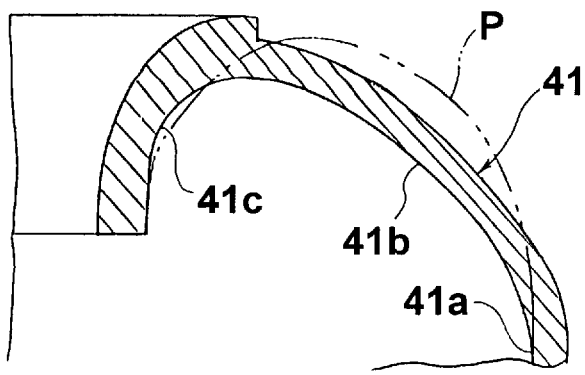
FIG.3
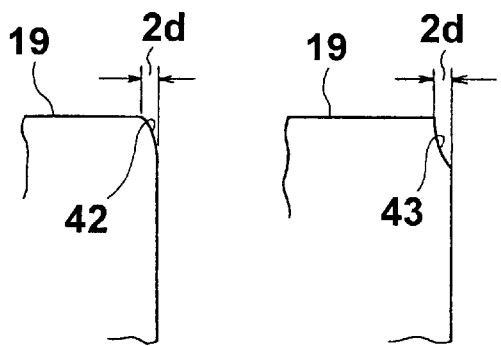
FIG.4(a)   FIG.4(b)
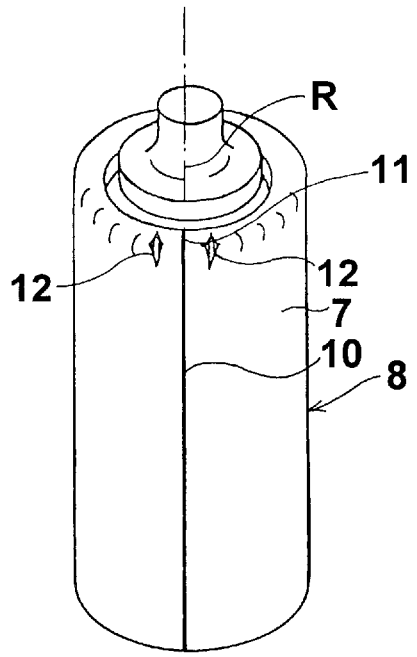
FIG.5

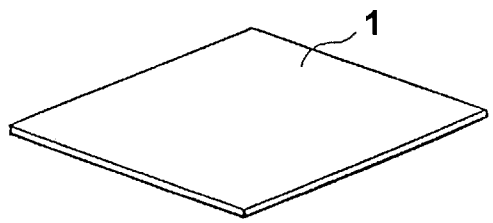
FIG.6(a)
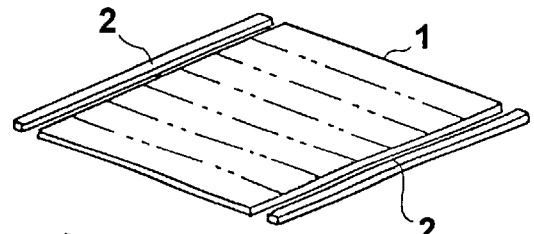
FIG.6(b)
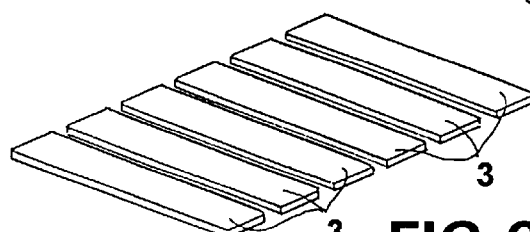
FIG.6(c)
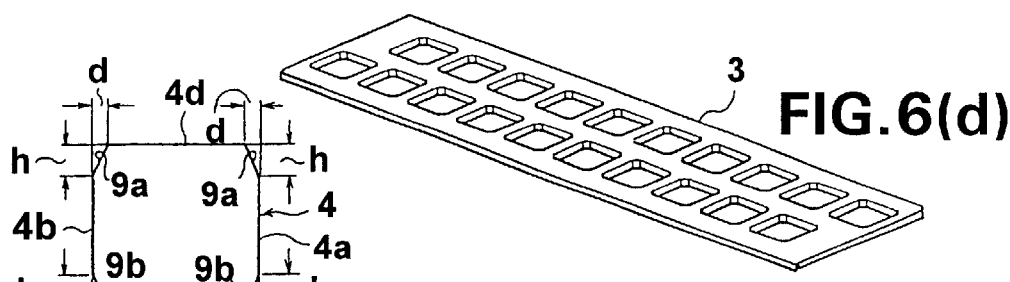
FIG.6(d)
FIG.6(e)
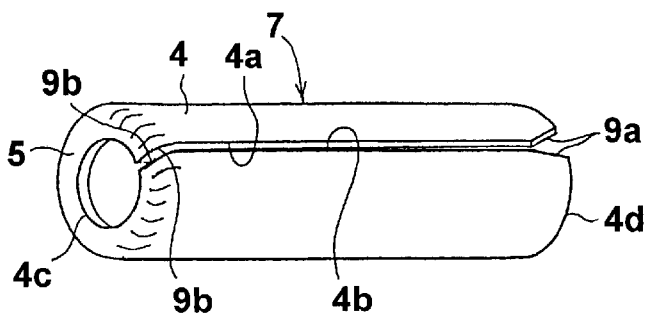
FIG.6(f)

DRY CELL AND METHOD OF MANUFACTURING OUTER METAL JACKET THEREOF

BACKGROUND

The present invention relates to a dry cell which is relatively small in size and has a cylindrical appearance and to a method of manufacturing an outer metal jacket of the dry cell.

Since the material for outer jackets of a small cylindrical dry cell was changed from paper to metal, its ability to prevent leakage has been improved thus increasing the performance of the dry cell. Such a metallic outer jacket of a dry cell (referred to as simply an outer metal jacket) is commonly fabricated in such a producing process as shown in FIG. 6. The procedure starts with cutting a hoop material of about 0.2 mm thickness made of tin-plated steel into rectangular base sheets 1 of predetermined dimensions, for example 785 mm wide and 850 mm long, as shown in FIG. 6(a). This is followed by slitting and trimming two edges of about 2 mm width along both opposing sides of the base sheet 1. After removing the two edge pieces 2, slits are formed which are equally spaced and parallel to the sides of the base sheet 1 as denoted by the two-dot chain lines in FIG. 6(b). The base sheet 1 is then cut along these slits into a group of intermediate strips 3 as shown in FIG. 6(c). Each intermediate strip 3 is punched out with a blanking die as shown in FIG. 6(d), thus producing a number of metal jacket blanks 4, one of which is shown in FIG. 6(e).

The metal jacket blank 4 is then rolled to a cylindrical shape as shown in FIG. 6(f). While two side edges 4a and 4b of the blank 4 are adjoined to each other, a base 4c is inwardly crimped to form a bottom 5, thus making a cylindrical outer metal jacket 7 with a bottom. The outer metal jacket 7 is loaded through the open end thereof with a cell member which comprises a power generating element filled in a zinc can and is coated with an insulating tube. The upper end 4d of the outer metal jacket 7 is then inwardly crimped to be pressed via an insulating ring against the shoulder of the cell member, thus producing a small cylindrical dry cell 8 as shown in FIG. 5.

The rectangular blank 4 punched out from the intermediate strip 3 has notches 9a, 9b at four corners thereof formed by removing triangular segments as shown in FIG. 6(e). When the blank 4 is rolled and its base 4c is crimped inwardly or its upper end 4d is crimped inwardly with the cell member loaded therein, each pair of notches 9a or 9b, at the upper or lower side are adjoined to each other along a joint 10 between the two side edges 4a and 4b or in the radial direction R of the outer metal jacket 7, forming a curled abutment joint 11 as shown in FIG. 5.

More specifically, for forming the curled abutment joint 11, the periphery of the outer metal jacket 7 at its upper end is pressed into a specific semicylindrical curling mold which has a curved cross section. As the upper end of the outer metal jacket 7 is gradually bent to form an even curve all around its periphery, the opposing notches 9a are steadily adjoined to each other from the outer side to the inner side. When the notches 9a are bent to abut each other, a considerable amount of stress is locally exerted along the curled abutment joint 11 and the bending stress is concentrated thereon thus causing buckling.

Further, the cell member loaded in the outer metal jacket 7 varies in height. If the cell member is short, an extra stress is given after the two notches 9a are attached to each other to form the curled abutment joint 11. Such locally concentrated bending stress causes dents 12 on either side of the abutment joint as shown in FIG. 5, which damage the appearance of the outer metal jacket 7. Also, the two notches 9a are fixedly pressed against each other along the curled abutment joint 11, thus firmly pressing a seal member of the cell, which may obstruct the discharge of a gas from the cell in case the gas pressure inside the cell 8 soars unexpectedly.

In order buckling, an improved cylindrical dry cell has been proposed in which four corners of an outer metal jacket blank at upper and lower ends of both sides are rounded off by removing segments of different lengths or heights which are determined in a specific ratio (as disclosed in Japanese Utility-model Publication No. 1-19053). However, it is necessary to cut the blank of the cylindrical dry cell to a desired shape under precise control of the blanking operation. Especially for producing dry cells of small size, it is difficult to precisely control the configuration of tiny blanks when punching them out. On the other hand, the outer metal jacket for dry cells of larger size is jointed by laser welding, whereby the buckling is prevented. However, laser welding is generally not utilized for producing small dry cells because of its low productivity and high producing cost.

In order to form the small notches 9a, 9b having a desired configuration at four corners of the metal jacket blanks 4 in the production process of the outer metal jacket 7 described above, there is virtually no alternative but to punch out a plurality of blanks 4 from the rectangular intermediate strip 3 which is slightly greater in width than a pair of blanks 4 arranged side by side as shown in FIG. 6(d). When the dry cell is large in overall size, the notches may be provided by cutting off four corners of a rectangular strip. However, the notches 9a, 9b of the blank 4 for smaller dry cells are normally minute, i.e., have a height h of 2.2 mm along the sides 4a and 4b and a width d of 0.35 mm from the sides 4a and 4b. The cutting tool of the cutting machine for providing such minute notches 9a, 9b must be extremely sharp and has a short life. Moreover, it is impossible in practice to securely hold a tiny metal jacket blank 4 precisely at a given position.

Accordingly, a waste of material is left in a large amount after the intermediate strip 3 is punched out as can be seen from FIG. 6(d). The number of the blanks 4 punched out from the intermediate strip 3 is limited thus being inefficient in production. In light of the mass production of small dry cells in recent years, such method as described above which creates the loss of material is unfavorable from the economical point of view.

It is thus an object of the present invention to provide a dry cell having such a configuration that any dents caused by the buckling when crimped is effectively prevented, and a method of producing the outer metal jackets efficiently.

SUMMARY OF THE INVENTION

In order to solve the above described problems, a dry cell of the present invention is comprised of a cylindrical cell member and an outer metal jacket for encasing the cell member, the metal jacket being formed by rolling a metal jacket blank of a rectangular metal strip into a cylindrical shape to cause the opposing side edges thereof to abut each other and by inwardly curling and crimping a lower end of the blank to make a bottom, the cell member being sealed in the metal jacket by inwardly curling and crimping an upper end of the metal jacket. The metal jacket blank is provided with notches at both corners of one side edge thereof where the abutment joint is formed, and the notches are respectively adjoined to an upper end and a lower end of the other side edge of the blank, forming a curled abutment joint along a direction which is different from the radial direction of the metal jacket.

The blank for the metal jacket has notches at the upper and lower ends of only one side thereof. Thus, the upper and lower notches come into direct contact with their corresponding edges of the other side at the very end of the curling action. As the notches come to join with the other end to form the curled abutment joint at the very end of the curling action, the bending stress is not concentrated locally to the curled abutment joint, thus creating no dents caused by the buckling.

It is preferable that the width of the notches at one side edge of the metal jacket blank is determined to correspond with the other side edge which exceeds a line along the radial direction at both ends of the cylindrical metal jacket.

This permits the two notches at the side edge of the blank to be adjoined to their respective upper and lower ends of the other side without making gaps. The curled abutment joint of a favorable configuration can be formed, contributing to a better appearance of the dry cell.

A method of producing a dry cell outer metal jacket for encasing a cell member therein according to the present invention comprises the steps of: cutting a rectangular sheet of a metallic material along the lines at equal intervals parallel to one side of the sheet to form a plurality of first intermediate strips of a rectangular shape; cutting the first intermediate strip along the lines at equal intervals perpendicular to the lengthwise direction to form a plurality of second intermediate strips of a rectangular shape; cutting the second intermediate strip with a press cutter into two pieces along a line in the middle and at the same time removing both edges of substantially a triangular shape at either end along the line, so as to form a pair of metal jacket blanks of the same shape respectively having notches at upper and lower ends of only one side edge thereof; and rolling the blank into a cylindrical shape to cause two opposite sides to abut each other and inwardly curling and crimping the lower end of the cylindrical blank to make a bottom.

According to such method of producing the outer metal jackets, the notches can be readily and quickly provided at both upper and lower edges of only one side edge of the metal jacket blank when dividing the second intermediate strips into two blanks in the punching process. This is because the second intermediate strip can be secured at both sides of the cutting line when being punched, and because it is unnecessary to provide notches at upper and lower edges of the other side of the blank as in the prior art.

As compared with the conventional method in which a group of intermediate blanks of a rectangular shape are punched out from a material sheet, the method of the present invention minimizes the waste of material after the blanks are punched and rolled to the metal jackets. The number of the blanks cut out from the material sheet is increased thus improving the efficiency of production. Since the dry cells are produced in great quantity, greater economy of material can be attained.

It is preferable that the second intermediate strip is divided into the two metal jacket blanks by the press cutting action with a punching tool which comprises a slit forming portion having a width of about 1 mm and a pair of substantially triangular notch forming portions connected uniformly to either end of the slit forming portion. The life of the punching tool can be lengthened due to such configuration.

The dry cell according to the present invention can be readily produced by the method of the present invention, in which the upper end of the outer metal jacket is inwardly curled and crimped after a cell member of a cylindrical shape is loaded into the metal jacket from the upper opening thereof.

BRIEF DESCRIPTION OF THE DRAWINGS

FIGS. 1(a)–1(d) illustrate a dry cell according to one embodiment of the present invention, in which FIG. 1(a) is a perspective view of an upper part of the dry cell, FIG. 1(b) is a plan view of the same, FIG. 1(c) is a half cut-away longitudinal cross sectional view of the same, and FIG. 1(d) is a front view of a blank of an outer metal jacket;

FIGS. 2(a)–2(g) show steps of producing the outer metal jacket of the dry cell;

FIG. 3 is a half longitudinal cross sectional view of a mold designed for crimping the outer metal jacket;

FIGS. 4(a) and 4(b) are front views showing modifications of the blank;

FIG. 5 is a perspective view of a conventional dry cell; and

FIGS. 6(a)–6(f) show steps of producing the outer metal jacket of the conventional dry cell.

DETAILED DESCRIPTION

Figure 1A:
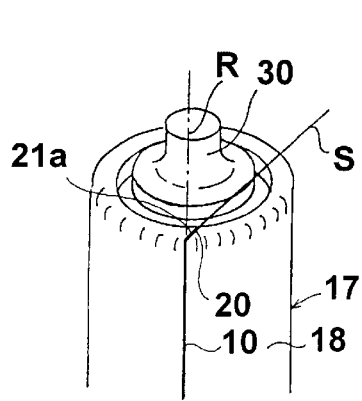
Figure 1B:
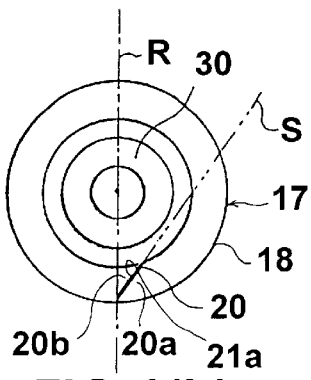
Figure 1C:
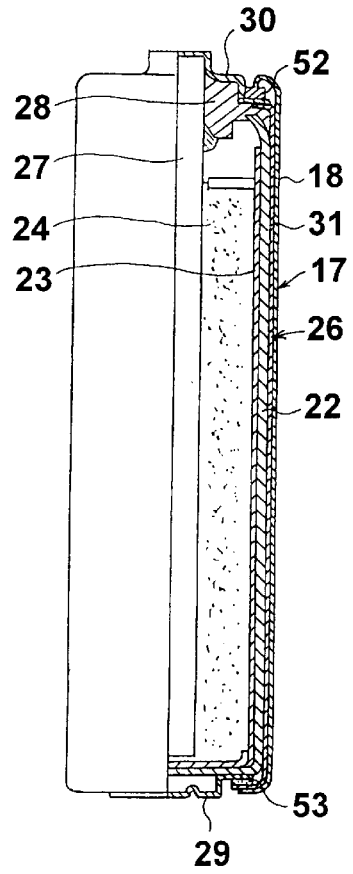
Figure 1D:
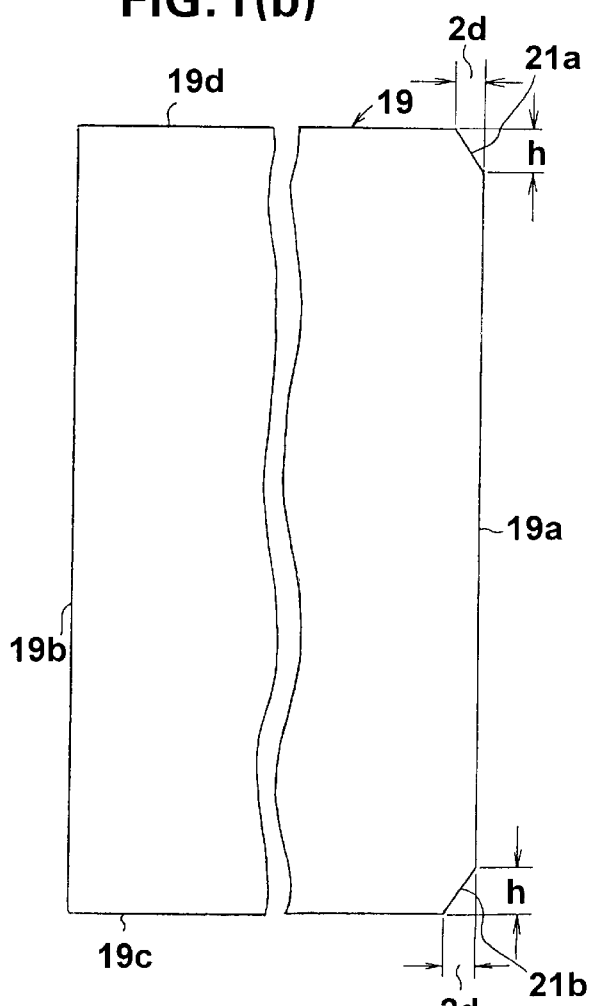

Preferred embodiments of the present invention will be described in details referring to the accompanying drawings. FIGS. 1(a)–1(d) illustrate a dry cell 17 according to the embodiment of the present invention, in which FIG. 1(a) is a perspective view of an upper part of the dry cell, FIG. 1(b) is a plan view of the same, FIG. 1(c) is a half cut-away longitudinal cross sectional view of the same, and FIG. 1(d) is a front view of a blank 19 of an outer metal jacket 18 of the dry cell 17. A characteristic of this dry cell 17 is that its curled abutment joint 20 is formed at upper and lower ends of the outer metal jacket 18 along a direction S which is different from the radial direction R of the metal jacket 18 as shown in FIGS. 1(a) and 1(b). The blank 19 for the metal jacket 18 has notches 21a and 21b at only two corners thereof between one side 19a and an upper and lower sides 19c, 19d, and the other side 19b is not provided with any notches as best shown in FIG. 1(d). Since the two notches 21a and 21b are formed on one side 19a of the blank 19, the width 2d of the notches is two times greater than that of the conventional notches while the height h which is equal to an inward curling margin of the metal jacket 18 remains the same.

The structure of the dry cell 17 is now explained. As shown in FIG. 1(c), a separator 23 impregnated with an electrolyte is fixedly disposed to the inner wall of an anode zinc can 22 of a cylindrical shape with a bottom, and filled with a cathode active material or a cathode mixture 24. A carbon electrode 27 serving as a collector is extended through the center of the cathode mixture 24. The upper opening of the anode zinc can 22 is hermetically sealed with a seal member 28 through which the carbon electrode 27 penetrates. The bottom face of the anode zinc can 22 is capped with a negative terminal plate 29, while the protruding upper end of the carbon electrode 27 is capped with a positive terminal plate 30. The cathode mixture 24 may be made of a mixture of an active material such as manganese dioxide and a conductive material such as acetylene black or graphite added with an electrolyte, and is compressed into a cylindrical form and tightly pressed around the carbon electrode 27. The cathode mixture 24 is wrapped with the separator 23 and loaded in the anode zinc can 22, which is then coated with an insulating tube 31 thus constituting a cell member 26. The cell member 26 is inserted into the outer metal jacket 18 which is crimped at the upper end thereof and fixedly accommodated in the metal jacket 18 with an upper insulating ring 52 inserted therebetween. The reference numeral 53 denotes a lower seal ring.

The procedure of manufacturing the outer metal jacket 18 of the dry cell 17 will be explained referring to FIGS. 2(a)–2(g) which shows the steps in producing order. As shown in FIG. 2(a), a hoop material made of tin-plated steel being about 0.2 mm in thickness is cut into rectangular sheets 1 of given dimensions similarly with the prior art. The sheet 1 is then cut with a slitter along the cutting lines denoted by the two-dot parallel chain lines and divided into a pair of edge strips 32 of about 2 mm wide and a given number of first intermediate strips 33 of a rectangular shape parallel to the edge strips 32, as shown in FIG. 2(b). The first intermediate strip 33 is trimmed at both lengthwise ends by slitting and cut along a group of parallel cutting lines which cross at right angles with the lengthwise direction to obtain second intermediate strips 34 of a smaller rectangular shape, as shown in FIG. 2(c). The length of the second intermediate strip 34 is 1 mm longer than that of the two blanks 19 arranged adjacent to each other.

As shown in FIG. 2(d), the second intermediate strip 34 is separated into two metal jacket blanks 19 as shown in FIG. 2(e) or FIG. 1(d) with a punching tool 37 by cutting at right angles with respect to the lengthwise direction at its center. The punching tool 37 comprises a slit forming portion 37a for making a cutting slit of about 1 mm wide and a pair of substantially triangular notch forming portions 37b and 37c connected to either end of the slit forming portion 37a. Each end of the notch forming portions 37b and 37c is greatest in width which is equal to a sum of two times the width 2d of the notch 21 and the 1 mm width of the slit forming portion 37a. Accordingly, the notch forming portions 37b and 37c of the punching tool 37 are of greater size for cutting a couple of the notches 21, of which width 2d is two times greater than that of the notch 9 in the conventional method.

As compared with the conventional method in which the metal jacket blanks 4 are punched out from the intermediate strip 3 (FIG. 6), the blanks 19 are obtained by punching each of the group of second intermediate strips 34 which are divided from the first intermediate strip 33 in this embodiment. The waste of material in the cutting of the blanks 19 is thus decreased to about ¼ of that in the conventional method of producing the outer metal jacket 18. The number of the blanks 19 cut out from the given size of the sheet 1 is increased, enhancing the productivity accordingly. The productivity was increased by about 6 percent according to experiments as compared with the prior art. This increase will yield various economical merits since the small dry cells are manufactured in a great amount recently.

It is inevitable that burrs 38 are created on both sides of the blanks as shown in FIG. 2(f) in the cutting process to form the slits shown in FIGS. 2(b) and 2(c) and in the punching process to divide the strips into blanks with the punching tool 37 as shown in FIG. 2(d). A step shown in FIG. 2(f) for pounding the burrs is thus provided in which the blank 19 is placed on a bed 40 and vertically hammered with burr hammers 39 to remove the burrs 38.

After the burrs 38 are removed, the blank 19 is rolled so that its sides 19a and 19b are abutted each other as shown in FIG. 2(g). Further, the lower end 19c is inwardly curled to make the cylindrical outer metal jacket 18 with a bottom. The cell member 26 is loaded into the metal jacket 18 with the upper insulating ring 52 and the lower seal ring 53 as shown in FIG. 1(c). The upper end 19d of the metal jacket 18 is then inwardly crimped to press the edge of the metal jacket 18 onto the terminal surface of the cell member 26, with the upper insulating ring 52 firmly placed therebetween, completing the small cylindrical dry cell 17 as shown in FIG. 1(c).

For crimping the upper end 19d of the outer metal jacket 18, a mold 41 shown in FIG. 3 is used. FIG. 3 illustrates a longitudinal cross section of one half of the mold 41 of a cylindrical shape. The mold 41 has a pre-bending surface 41b extending upwardly and obliquely from a bending start end 41a toward the center and a bending surface 41c curving from the upper end of the pre-bending surface 41b downwardly to the center. The upper end 19d of the metal jacket 18 loaded with the cell member 26 is curled by being firmly pressed into the mold 41 from below. Denoted by the two dot chain line is the configuration of the mold P in the prior art for comparison with the present invention.

The blank 19 for the outer metal jacket 18 has the notches 21 at the upper and lower ends of only one side edge 19a thereof. Thus, the upper and lower notches 21a and 21b come into direct contact with their corresponding edges of the other side edge 19b at the very end of the curling action. As it is not necessary to gradually adjoin the notches of the blank from the outer side toward the inner side as in the prior art arrangement, the upper end 19c is freely curled along the pre-bending surface 41b towards the center of the mold 41, and the notches come to join with the other end 19b to form the curled abutment join 20 at the very end of the curling action. The bending stress is thus not concentrated locally to the curled abutment joint 20, thus creating no dents caused by the buckling.

Of the curled abutment joint 20, one side edge 20a having the notch 21a is less rigid than the other side edge 20b without the notch. In case that the gas pressure inside the cell soars unexpectedly, the side edge 20a is more prone to curl up on receipt of the gas pressure, creating a gap, through which the gas can escape to the outside. The dry cell according to the present invention thus has improved performance of preventing explosions.

The notches 21a and 21b are not limited to the straight configuration as has been described but may be formed in any appropriate shapes such as an outwardly curved convexed notch 42 or an inwardly curved concaved notch 43 as shown in FIGS. 4(a) and 4(b). In either case, the width of the notches 42 and 43 is set to be two times greater than the width d of the prior art in which notches are provided at both edges of the blank.

According to the method of producing the outer metal jacket 18 of the present invention, the yield of products was increased by about 9 percent as compared with the conventional method hence considerably contributing to economical profits.

As set forth above, the present invention is advantageous in producing dry cells or outer metal jackets of the dry cells more efficiently and productively.

What is claimed is:
1. A dry cell including a cylindrical cell member and an outer metal jacket for encasing the cell member, the metal jacket being formed by rolling a metal jacket blank of a rectangular metal strip into a cylindrical shape to cause opposing side edges of the metal strip to abut each other and form an abutment joint and by inwardly curling and crimping a lower end of the blank to make a bottom, the cell member being sealed in the metal jacket by inwardly curling and crimping an upper end of the metal jacket, wherein:

the metal jacket blank is provided with notches at both corners of a first side edge of the side edges where the abutment joint is formed; and the notches are respectively adjoined to an upper end and a lower end of a second side edge of the side edges of the metal jacket blank forming a curled abutment joint in a direction which is different from a radial direction of the metal jacket.

2. A dry cell according to claim 1, wherein the width of the notches of the metal jacket blank is substantially equal to a length of upper and lower edges of the metal jacket blank situated between a line in the radial direction aligning with the abutment joint and a line in the direction of the curled abutment joint.

3. A method of producing a dry cell outer metal jacket for encasing a cell member therein, comprising the steps of:

cutting a rectangular sheet of a metallic material along lines at equal intervals and parallel to one side of the sheet to form a plurality of rectangular first intermediate strips;

cutting the first intermediate strip along lines at equal intervals and perpendicular to a lengthwise direction of the first intermediate strip to form a plurality of rectangular second intermediate strips;

cutting the second intermediate strip into two pieces along a line in a middle thereof and simultaneously removing from both edges at an intersection of the line a substantially triangular shape at either end along the line, so as to form a pair of metal jacket blanks of a same shape having notches at upper and lower ends of a first side edge formed by said cutting; and rolling the blank into a cylindrical shape to cause the first side edge and a second side edge, opposite the first side edge, to abut each other and inwardly curling and crimping the lower end of the cylindrical blank to make a bottom.

4. A method of producing a dry cell outer metal jacket according to claim 3, wherein the second intermediate strip is divided into the two metal jacket blanks by a press cutting action with a punching tool which comprises a slit forming portion having a width of about 1 mm and a pair of substantially triangular notch forming portions connected uniformly to the ends of the slit forming portion.

5. A method of producing a dry cell outer metal jacket according to claim 3 or 4, wherein the upper end of the metal jacket is inwardly curled and crimped after a cell member having a cylindrical shape is loaded into the metal jacket from an upper opening thereof to complete a dry cell.

6. A dry cell according to claim 1, wherein the notches are straight.

7. A dry cell according to claim 1, wherein the notches are convex.

8. A dry cell according to claim 1, wherein the notches are concave.

9. A dry cell comprising a substantially cylindrical cell member; and a substantially cylindrical outer metal jacket encasing said cell member, said outer metal jacket comprising a metal jacket blank having first and second side edges abutting one another to form an abutment joint and notches only at both corners of said first side edge, upper and lower ends of said metal jacket blank being inwardly curled and crimped such that said notches of said first side edge adjoin an upper and lower end of said second side edge and form curled abutment joints in directions different than a radial direction of said outer metal jacket and said cell member is sealed in said outer metal jacket.

10. A dry cell according to claim 9, wherein said notches have a width substantially equal to a length of upper and lower edges of said metal jacket blank situated between a line in the radial direction aligning with said abutment joint and a line in the direction of a respective one of said curled abutment joints.

11. A dry cell according to claim 9, wherein said notches are straight.

12. A dry cell according to claim 9, wherein said notches are convex.

13. A dry cell according to claim 9, wherein said notches are concave.

14. A method for producing a dry cell outer metal jacket for encasing a cell member, comprising the steps of:

cutting a rectangular sheet of a metallic material at equal intervals and parallel to one side of the sheet to form a plurality of rectangular first intermediate strips;

cutting the first intermediate strip at equal intervals and perpendicular to a lengthwise direction of the first intermediate strip to form a plurality of rectangular second intermediate strips;

cutting the second intermediate strip into two pieces along a line in the middle and removing a substantially triangular portion from each end of the second intermediate strip along the line to thereby form a pair of metal jacket blanks having the same shape and including notches at upper and lower ends of only one side edge; and rolling the blank into a cylindrical shape to cause opposite side edges to abut each other and inwardly curling and crimping the lower end of the cylindrical blank to make a bottom.

15. A method of producing a dry cell outer metal jacket according to claim 14, wherein the second intermediate strip is cut and the triangular portions are removed from each end of the second intermediate strip at the same time.

16. A method for producing a dry cell outer metal jacket according to claim 14, further comprising the step of using a press cutter to cut the second intermediate strip into two pieces.

17. A method for producing a dry cell outer metal jacket according to claim 14, further comprising the step of using a punching tool providing a press cutting action to cut the second intermediate strip into two pieces.

18. A method for producing a dry cell outer metal jacket according to claim 17, further comprising the step of providing the punching tool with a slit forming portion and a pair of substantially triangular notch forming portions connected to ends of the slit forming portion.

19. A method for producing a dry cell outer metal jacket according to claim 14, further comprising the step of inwardly curling and crimping an upper end of the metal jacket after a cell member having a cylindrical shape is loaded into the metal jacket from an upper opening thereof to complete a dry cell.

* * * * *